United States Patent Office 3,561,983
Patented Feb. 9, 1971

3,561,983
COMPOSITIONS HAVING ALKALI METAL TRI-POLYPHOSPHATE AND ALKALI METAL HYDROXIDE AND METHODS OF MAKING SAME
Louis Sair, Evergreen Park, and Irving Melcer, Park Forest, Ill., assignors to The Griffith Laboratories, Inc., Chicago, Ill., a corporation of Illinois
No Drawing. Continuation-in-part of application Ser. No. 658,349, Aug. 4, 1967. This application Feb. 24, 1970, Ser. No. 13,750
Int. Cl. A23b 1/01; A23l 3/34
U.S. Cl. 99—222
19 Claims

ABSTRACT OF THE DISCLOSURE

A particulate composition suitable for use in meat curing media, which composition includes the combination, either as a mechanical mix of controlled stability or as compacted granules of controlled stability, of particular amounts or proportions of alkali metal hydroxide and alkali metal tripolyphosphate.

A package having said particulate composition within a moisture-impervious barrier.

A method of making said compacted granules of said composition under controlled conditions and, if desired, placing said compacted granules within a moisture-impervious barrier.

---

This application is a continuation-in-part of our copending application Ser. No. 658,349, filed Aug. 4, 1967 now abandoned.

This invention relates to (a) a particulate composition suitable for use in meat curing media such as pickle liquor, which composition includes the combination, either as a mechanical mix of controlled stability or compacted granules of controlled stability, of particular amounts or proportions of alkali metal hydroxide and alkali metal tripolyphosphate, (b) a package having such composition within a moisture-impervious barrier, and (c) a method of making such compacted granules of the composition under controlled conditions and, if desired, placing such compacted granules within a moisture-impervious barrier.

The terms "sodium hydroxide" and "NaOH" as used herein include commercial sodium hydroxide such as commercial caustic soda. The term "alkali metal hydroxide" as used herein thus covers, among other things, commercial caustic soda.

The term "sodium tripolyphosphate" as used herein includes commercial grade sodium tripolyphosphate. The term "alkali metal tripolyphosphate" as used herein thus covers, among other things, commercial grade sodium tripolyphosphate.

Fresh meat normally has a pH in the range between about 5.5 and 6.2, largely because of its content of lactic acid formed at slaughter by the break-down of blood and muscle sugar, namely, glycogen. The arterial and/or muscular pumping and injection of curing salt solution or pickle liquor into meat and increasing the pH of the meat toward a pH of about 7 are well known. The meat may also be later immersed in a pickle liquor.

It is also known that when certain salts of an acid of phosphorus, such as alkali metal phosphates, are included in such treatment, the water-binding capacity of meat, particularly whole meat or canned meat products, is increased and in cooking such treated meat there is less shrinkage of the meat and attendant purging of juices. It is also known that the phosphate salts function in this manner in the presence or in the absence of other edible materials such as exemplified by sodium chloride, sugar, sodium nitrite, sodium nitrate, and acidic water-soluble antioxidant compounds having an enediol group, such as sodium erythorbate, sodium ascorbate and sodium iso-ascorbate (see U.S. Pats. 2,739,899, 3,122,442, 3,139,-347, 3,231,392 and 3,391,007).

Numerous curing compositions have been prepared for use in improving and stabilizing the color and obviating shrinkage of meat products such as beef, pork, mutton, hams (both smoked and canned), picnics, loins, and various sausages such as frankfurters, bologna, and the like. In practice, the alkali metal phosphates which have been available for use as components of meat-curing media are sodium phosphates having a $Na_2O$ to $P_2O_5$ molar ratio of about 1.7:1. Such alkali metal phosphates have a pH in a 1 percent aqueous solution, for example, of about 9.8. The increase in the pH of meat tends to inhibit shrinkage of meat products when such phosphates are injected in the arteries and/or muscles of the meat, or otherwise contacted with the meat. When the pH of the meat is increased above the isoelectric point of the meat proteins, the water-binding capacity of the meat is increased.

In actual practice, the selection of the alkali metal phosphate salt is limited by the solubility characteristics of the phosphate in the pickle liquor, with the commercial salt (sodium chloride) content limiting the solubility of certain effective phosphate salts. The effectiveness of the phosphate salts involves the alkali reserve which elevates the pH of the meat toward about 7.

Tetrasodium pyrophosphate, for example, is more effective weight-for-weight than sodium tripolyphosphate with respect to water-binding power, but its limited solubility does not permit the dissolving of a desired effective quantity of tetrasodium pyrophosphate in lixated brine (lixated brine is made with rock salt which introduces calcium into the liquor) used in treating meat. The use of high concentrations of tetrasodium pyrophosphate, for example, has been found objectionable to some packers who use pickle liquor made of certain commercial grades of sodium chloride (e.g., rock salt) which contain mineral impurities. Calcium ions, for example, react or combine with the tetrasodium pyrophosphate to form a precipitate which settles as sludge in the bottom of storage tanks.

Furthermore, the meat treating art has found it to be advantageous to use a tripolyphosphate in pickle liquor, as opposed to the use of an orthophosphate or pyrophosphate, since tripolyphosphate is more soluble in pickle liquor than orthophosphate, and pyrophosphate, unlike the polyphosphate, reacts or combines with calcium present in lixated brine to form an undesired precipitate.

Alkali metal tripolyphosphate is thus commonly used in pickle liquors used for treating meat products because of its good solubility characteristics, its ability to increase the pH of the meat toward a pH of about 7, and its ability to improve the water-binding capacity of the meat and thereby induce less shrinkage of the meat and less attendant purging of juices during cooking.

Although alkali metal tripolyphosphate, such as sodium tripolyphosphate, is generally regarded as being highly soluble in aqueous pickle liquor, the pH imparted by it to the pickle liquor is not sufficiently high for all purposes. Thus, when sodium tripolyphosphate is used, it has been found desirable also to use an edible, strongly alkaline material to raise the pH of the pickle liquor and meat to the desired pH values.

When meat such as ham is treated with pickle liquor having relatively high, but lawful amounts, of alkali metal tripolyphosphate, residual phosphate tends to impart an undesirable "phosphate" taste to the meat, and to cause the migration of salt content, including residual phosphate, from the meat to the surface of the meat in the form of white "snow," thereby imparting an undesirable surface taste and appearance. Therefore, much less than the upper lawful limit is commonly used in pickle liquors used for pickling meat such as ham.

We have discovered that unobvious advantages are obtained with particulate compositions having the new and unobvious combination of certain edible proportions of alkali metal tripolyphosphate and alkali metal hydroxide, as described below. Furthermore, we found that desirable benefits (e.g., good solubility in lixated brine) are obtained when such compositions do not introduce a substantial or undesired amount of reverted tripolyphosphate (orthophosphate or pyrophosphate) or reaction product of the alkali metal tripolyphosphate and alkali metal hydroxide into pickle liquor.

Government regulations have previously placed certain restrictions on the use of sodium hydroxide with meat products. However, it should be noted that in the "Federal Register," vol. 34, No. 36 (Friday, Feb. 21, 1969), which has been also identified as F.R. Doc. 69–2203, filed Feb. 20, 1969 (dated after the Aug. 4, 1967 filing date of our copending application Ser. No. 658,349), the Department of Agriculture, Consumers and Marketing Service, pursuant to the authority conferred by the Federal Meat Inspection Act, proposed amending Parts 317 and 318 of the Meat Inspection Regulations (9CFR, Parts 317 and 318) (more particularly subparagraph (4) of paragraph (b) of Part 318.7) by allowing the use of sodium hydroxide to decrease the amount of cooked-out juices of cured and canned hams, pork shoulder picnics and loins, and similar products, when sodium hydroxide is used in combination with phosphates in a ratio of four parts phosphate to one part sodium hydroxide (the combination shall not exceed 5% in pickle at 10% pump level (10 lbs. of pickle liquor per 100 lbs. of meat); 0.5% in the product).

In its broadest aspects, our invention concerns particulate compositions for use in meat curing media having the combination, either as a mechanical mix or granular blend or as compacted granules, of an alkali metal hydroxide such as sodium hydroxide and substantially non-reverted alkali metal tripolyphosphate such as sodium tripolyphosphate, either with or without other ingredients used in meat curing media (e.g., sugar, sodium chloride, sodium nitrate, sodium nitrite, enediol compound such as sodium erythorbate, sodium ascorbate and sodium isoascorbate, etc.), including a nitric-oxide-producing curing medium, particularly in amounts of about 5.5 to 30 parts or percent by weight of alkali metal hydroxide and about 94.5 to 70 parts or percent by weight of alkali metal tripolyphosphate, or, about 10 to 20 parts or percent by weight of the hydroxide and about 90 to 80 parts or percent by the weight of the phosphate. These controlled proportions of the members of the combination allow the most effective use of the combination in meat curing media, so as to reduce the shrinkage of meat products and attendant purging of juices, to avoid the bleeding or salting out of phosphate on the surface of meat, and to obviate undesired taste qualities which can be found when excessive levels of either the hydroxide or phosphate components are used in treating meat.

The stability of the particulate composition is effected by excessive moisture and/or temperature conditions.

The particulate composition of our invention, regardless of whether it is a mechanical mix or compacted granules, must be substantially free of available moisture, so that a major portion or at least about 75% by weight of the alkali metal tripolyphosphate remains non-reverted or does not react with the alkali metal hydroxide upon storage of the composition. We have found, for example, that the available moisture content should be less than about 5% or, preferably, not more than about 2% by weight (e.g., based on the weight of the alkali metal tripolyphosphate and alkali metal hydroxide) of added, free, or available water, and the tripolyphosphate should be capable of remaining in such non-reverted state (e.g., in a moisture-impervious barrier such as a bag or drum stored at room temperature) until the composition is normally used under ordinary or conventional commercial conditions (e.g., for at least about 2 months at room temperature).

We prefer that the particulate composition of our invention be free of other materials or quantities thereof which prevent the composition from having sufficiently good solubility characteristics in commercial pickle liquor, so that the liquor is substantially free of turbidity resulting for example, from insoluble calcium precipitate formed from or with the composition and impurities found with some commercial grades of sodium chloride (commercial sodium chloride can have mineral impurities which provide calcium ions) used in pickle liquor.

When proper proportions of a selected amount of the combination (e.g., sodium hydroxide and sodium tripolyphosphate) was used by us in a pickle liquor pumped in ham, we found that less shrinkage resulted in the ham than when either sodium tripolyphosphate was used without sodium hydroxide, or when sodium hydroxide was used without the phosphate. When sodium hydroxide was used in a pickle liquor without sodium tripolyphosphate, there was more shrinkage in ham, despite the fact that the ham had a slightly higher pH, than resulted with the use of sodium tripolyphosphate without sodium hydroxide, and there was poorer utilization of nitrite (from pickle liquor) than occurred with the use of the phosphate without the sodium hydroxide.

We found that the use of a composition having or introducing too much sodium hydroxide, either with sodium tripolyphosphate or without it, caused slight bitterness in ham; similarly, the use of too much sodium tripolyphosphate without the sodium hydroxide provided some indication of a slight residual "phosphate" taste. Further, the use of too much tripolyphosphate can cause migration of the salt content, as well as residual phosphate, from the meat to the surface of meat in the form of white "snow" which imparts an undesirable surface taste and appearance.

When compositions having our combination of alkali metal tripolyphosphate and alkali metal hydroxide is formed by compaction, the product can be formed so as to be non-dusting, less hygroscopic, and of substantially uniform chemical content for different gradations of size (although residual fines may require removal, reblending and compaction).

Several reversion problems, however, were encountered in attempting to compact compositions having alkali metal tripolyphosphate and alkali metal hydroxide.

We found that if the alkali metal tripolyphosphate-alkali metal hydroxide composition is subjected to too high a temperature or too much water or moisture before or during or after compaction, substantial reversion of the alkali metal tripolyphosphate is triggered or results. As one increases the proportion of alkali metal hydroxide used, the alkali metal tripolyphosphate is more inclined to undergo increased reversion. The particular conditions which exist at one of these stages of manufacture or use effects the particular conditions which should or can exist at another stage and are interrelated and subject to some variation.

The temperature of the composition and the presence of water must be controlled, otherwise substantial reversion can result. Consequently, the amount of pressure used during compaction and the type of compaction and related equipment used, the length of time during which compaction occurs, and the degree to which the presence of water is obviated, must be controlled.

When compaction is utilized in forming our compositions, a substantially uniform, dry mixture having substantially non-reverted alkali metal tripolyphosphate and alkali metal hydroxide should be used. The temperature and moisture content of that mixture must be controlled so as to avoid the initiation of substantial reversion of the phosphate. That mixture must be compacted under controlled temperature, moisture and compaction pressure conditions, thereby providing effective compaction and bonding together of the ingredients of the mixture without initiating or causing substantial reversion of the phosphate.

More specifically, in producing a substantially free-flowing, non-caking, non-dusting, compacted granular composition for use in meat curing media, we subject a substantially uniform, substantially dry, particulate mixture having, for example, about 70 to 94.5 parts or percent by weight of alkali metal tripolyphosphate and about 30 to 5.5 parts or percent by weight of alkali metal hydroxide to effective compaction pressure in the substantial absence of water under controlled compaction pressure and temperature conditions. This causes the effective and controlled compaction and bonding together of the ingredients of the mixture so that at least a major portion of the phosphate remains substantially non-reverted and produces a compacted, granular composition wherein at least a major portion or a substantial portion of the phosphate remains non-reverted upon storage of the composition.

The substantially dry mixture which is to be subjected to compaction, for example, should have less than about 5% or not more than about 2% by weight added, available or free water or moisture (e.g., based on the weight of the tripolyphosphate and alkali metal hydroxide) and should not have or be subjected to a temperature above about 80° F., so that substantial reversion of the tripolyphosphate or substantial reaction of the phosphate with the alkali metal hydroxide is not initiated or triggered. Compaction should be conducted under controlled conditions so that the temperature of the mixture does not exceed, for example, about 110° F. and its moisture content is not substantial (e.g., less than about 5% or not more than about 2% by weight added, available or free water), again, so that such reversion or reaction is not initiated or triggered.

It will be apparent to those skilled in the art that the compaction necessary to accomplish the forming by granulation referred to above may be achieved in many ways. It is essential to form granules using compaction, although the granules may be in the form, for example, of pellets, or even a cake which is subsequently crushed, but which results in a free-flowing or non-caking composition. The exact size and shape of the granules is not deemed to be important, provided the resulting product is free-flowing or noncaking under selected storage conditions.

Referring next to the examples which follow later below, Example 1 shows that the pickle liquor having 16 pounds of sodium tripolyphosphate caused substantially less shrink and a lower pH in ham than the pickle liquor having 3.5 pounds of sodium hydroxide, and the latter pickle liquor caused a poorer utilization of nitrite, as evidenced by more residual nitrite in the ham, and appeared to produce a slight bitterness in ham.

Example 2 shows that the pickle liquor having 8 pounds of sodium tripolyphosphate and 2 pounds of sodium hydroxide caused less shrink in ham than resulted from the utilization of the pickle liquor having 16 pounds of sodium tripolyphosphate. Example 3 also shows that the pickle liquor with 8 pounds of sodium tripolyphosphate and 2 pounds of sodium hydroxide caused less shrink in ham than resulted from the use of the pickle liquor having 16 pounds of sodium tripolyphosphate.

Example 4 shows that the pickle liquor with 8 pounds of sodium tripolyphosphate and 3 pounds of sodium hydroxide produced in ham slight bitterness according to some tasters and caused less shrink than the pickle liquor with 16 pounds of sodium tripolyphosphate.

Example 5 shows that the pickle liquors having (a) 16 pounds of sodium tripolyphosphate and 2 pounds of sodium hydroxide, (b) 8 pounds of sodium tripolyphosphate and 2 pounds of sodium hydroxide, and (c) 16 pounds of sodium tripolyphosphate, in the order listed, were progressively less effective in reducing shrink of ham.

Example 6 shows that the pickle liquor having 16 pounds of sodium tripolyphosphate and 2.5 pounds of sodium hydroxide, and, to a lesser degree, the pickle liquor with 32 pounds of sodium tripolyphosphate and 2 pounds of sodium hydroxide, and, to a still lesser degree, the pickle liquor with 16 pounds of sodium tripolyphosphate and 2 pounds of sodium hydroxide, caused less shrink of ham than the pickle liquor with 32 pounds of sodium tripolyphosphate; however, the pickle liquor having 16 pounds of sodium tripolyphosphate produced more shrink in ham than was obtained with 32 pounds of sodium tripolyphosphate; some tasters thought that the pickle liquors with the relatively high levels of phosphate, namely, 32 pounds of sodium tripolyphosphate and 2 pounds of sodium hydroxide, and 32 pounds of sodium tripolyphosphate, respectively, produced in ham a "phosphate" taste; and some tasters thought that the pickle liquor with 16 pounds of sodium tripolyphosphate and 2.5 pounds of sodium hydroxide appeared to produce a slightly bitter taste.

Example 7 shows that when a moist blend having 8 parts by weight of sodium tripolyphosphate and 2 parts by weight of sodium hydroxide was heated, the sodium tripolyphosphate substantially reverted.

Example 8 shows that the sodium tripolyphosphate in a moist blend having 500 parts by weight of sodium tripolyphosphate, 42 parts by weight of sodium hydroxide, and 78 parts by weight of water, as mentioned in U.S. Pat. 3,104,978, underwent reversion that increased with the passage of time. This indicates that the presence of moisture tends to induce reversion of the phosphate. Although data shown in Example 8 indicates that the reaction sought by U.S. Pat. 3,104,978 did not occur as rapidly as mentioned in that patent, this could be due to the type of equipment used and the particular nature of the materials used.

Example 9 shows that sodium tripolyphosphate in a blend of 80% of sodium tripolyphosphate and 20% of sodium hydroxide tends to undergo reversion when it is heated sufficiently to progressively higher temperatures.

Example 10 shows that sodium tripolyphosphate in blends having 80% of sodium tripolyphosphate and 20% of sodium hydroxide (no water was added as such, although too high a humidity can cause moisture to be absorbed) tends to undergo increasing degrees of reversion as the blends were heated to progressively higher temperatures.

Example 11 shows that when a blend having 80% of sodium tripolyphosphate and 20% of sodium hydroxide (no water was added as such) was subjected at room temperature to increasing levels of compaction pressure in a Carver press, the level of reversion of the sodium tripolyphosphate tends to increase. Good compacted granules or pellets were obtained and no or little reversion occurred when the blend was compacted with sufficiently controlled or low pressures.

Example 12, which is similar to Example 11, also shows that as one increases the amount of compaction pressure above certain levels, particularly if the blend is heated to higher temperatures prior to compaction, the degree of reversion of the sodium tripolyphosphate tends to increase.

Example 13 shows that the development of too much heat prior to compaction and/or excessive compaction pressure tend(s) to cause the generation of heat and substantial reversion of the sodium tripolyphosphate with blends (to which no water was added as such) having either 80% of sodium tripolyphosphate and 20% of sodium hydroxide, or 702 pounds of sodium tripolyphosphate and 167 pounds of sodium hydroxide (see Example 9).

Example 14 shows that by cooling the blend before compaction and by cooling the compaction rolls, a blend of 80% of sodium tripolyphosphate and 20% of sodium hydroxide can be effectively compacted into granules without causing visible substantial reversion of the sodium tripolyphosphate.

Example 15 shows that if a blend of 80% sodium tripolyphosphate and 20% of sodium hydroxide is at too high a temperature prior and/or during compaction, reversion of the sodium tripolyphosphate can be triggered and substantial reversion can occur with the passage of time.

Example 16 shows that a blend (to which no water was added as such) having 8 parts of sodium tripolyphosphate and 2 pounds of sodium hydroxide could be effectively compacted with the compaction rolls of Example 14 without having the phosphate undergo visible substantial reversion.

Example 17 shows that compacted Sample "3B" of Example 14 (80% of sodium tripolyphosphate and 20% of sodium hydroxide) had good solubility characteristics when it was added to the pickle liquor.

Example 18 shows the need for not subjecting a blend of sodium tripolyphosphate-sodium hydroxide to excessively high temperatures prior to compaction, subjecting the blend to effective compaction pressure without causing an excessively high temperature rise, and maintaining a controlled or not excessively high temperature during storage or packaging of the compacted granules.

Example 19 shows that: blends having non-compacted sodium tripolyphosphate and sodium hydroxide tend to revert as the temperature increases; within the particular limits tested, the initiation of reversion did not appear to be noticeably dependent upon the proportion of sodium hydroxide present; however, if reversion does occur, the extent of the reversion tends to increase with an increase in the proportion of sodium hydroxide; and certain blends with sodium tripolyphosphate appear to be more heat stable with sodium hydroxide than blends having certain more highly molecularly dehydrated phosphates.

Example 20 shows that the compacted blends of Examples 14 (Sample "3B"), 15, and 18 exhibited no substantial reversion after being stored for selected periods of time.

Example 21 shows that the sodium tripolyphosphate present in a sodium tripolyphosphate-sodium hydroxide blend did not undergo substantial reversion during storage but did undergo reversion in an atmosphere having too high a humidity.

Example 22 shows that compositions having sodium tripolyphosphate and sodium hydroxide and a substantial amount of available moisture are unstable as evidenced by the reaction of tripolyphosphate and sodium hydroxide and resulting reversion of tripolyphosphate. This instability was more pronounced when the proportion of moisture and/or sodium hydroxide present in the composition is increased. The absence of substantial water or the substantial absence of water affords the obtaining of a substantially stable composition.

U.S. Pat. 3,104,978 concerns a composition for use in meat curing pickles allegedly comprising a partially condensed, at least partially hydrated, amorphous alkali metal phosphate composition prepared by reacting an alkali metal tripolyphosphate with an alkali metal hydroxide capable of at least hydrating the tripolyphosphate in the presence of sufficient water to disperse the alkali metal compound and yield a homogeneous product.

Although, generally, the maximum amount of water in the aqueous solution of alkali metal compound is stated in that patent as being equal to about half the amount necessary to completely hydrate the tripolyphosphate (col. 2, lines 55–58), preferably, water is added in a proportion equivalent to between about 8% to about 13% by weight of the reaction mixture, and, more particularly, in an upper portion of that range (col. 2, lines 58–62).

The substantially homogeneous reaction product of U.S. Pat. 3,104,978 results from a substantially complete reaction (col. 2, lines 66–68). The alkali metal hydroxide is used up during the reversion of the tripolyphosphate. In fact, Example 1 of that patent states in the last sentence thereof that chemical and physical tests of the product showed "no evidence of free sodium hydroxide."

U.S. Pat. 3,104,978 also states that the reaction time needed to effect substantialy complete reaction and to produce a substantially homogeneous product will vary with the type of mixing equipment employed, but generally the reaction may be completed in between two and about six hours, although greater or lesser reaction periods may be employed if desired (col. 3, lines 11–18).

U.S. Pat. 3,104,978 does not mention the packaging of the product in a moisture-impervious barrier—much less any need for doing so.

U.S. Pat. 3,193,396 is concerned with uniformity of chemical composition, not with reversion of the phosphate. That patent, including column 3, lines 39–45, and Table 1 at the bottom of column 3, does *not* expressly disclose or point out, among other things, the following:

(a) The combination, or the importance of having the combination, of alkali metal hydroxide and substantially non-reverted alkali metal tripolyphosphate, either as a physical blend or compacted product, particularly in the proportions disclosed herein. (It should be noted, for example, that Table I at the bottom of column 3 of the patent does not disclose that combination.);

(b) With blends of the combination, the presence of too much water or moisture, either added as such or resulting from humidity conditions and/or too high a temperature cause or trigger the tripolyphosphate to undergo substantial reversion in the presence of alkali metal hydroxide;

(c) Process conditions which include compaction and involve controlled temperature, moisture or humidity, and compaction pressure conditions coordinated so as not to cause or trigger such reversion;

(d) The need for packaging the compositions of this patent application in a moisture-impervious barrier.

The examples, which follow, are intended, among other things, to illustrate: the importance of having both an alkali metal tripolyphosphate and alkali metal hydroxide in our composition, particularly in the proportions mentioned above; the relationship of and results effected by varying levels of moisture, temperature, compaction conditions (if used), and/or storage conditions on the stability or reversion of various levels of the tripolyphosphate or the reaction between the alkali metal hydroxide and the tripolyphosphate; conditions which can be used and should or must be avoided.

All parts and percentages expressed in the examples are on a weight basis unless otherwise specified. Further, sodium tripolyphosphate mentioned in the examples (unless indicated otherwise) is a commercial grade product and is in an anhydrous (substantially free of moisture and chemically bound water), powdered or granular form; the sodium hydroxide used (unless indicated otherwise) is also initially in an anhydrous (substantially free of moisture and chemically bound water), powdered or granular form; and the blends that are compacted are substantially homogeneous or substantially uniformly blended before compaction.

EXAMPLE 1

The following pickle liquors were prepared.

Pickle liquor "A"

Water: 50 gallons (416.5 pounds)
Sodium chloride: 71.25 pounds
Cane sugar: 25.00 pounds
Prague powder: 13.75 pounds
    90% Sodium chloride
    4% Sodium nitrate
    6% Sodium nitrite
Sodium tripolyphosphate: 16.00 pounds Pickle liquor "B"

Water: 50 gallons (416.5 pounds)
Sodium chloride: 71.25 pounds
Cane sugar: 25.00 pounds
Prague powder: 13.75 pounds
    90% Sodium chloride
    4% Sodium nitrate
    6% Sodium nitrite
Sodium hydroxide: 3.50 pounds It should be noted that Pickle Liquor "A" differs from Pickle Liquor "B" in that the former has 16 pounds of sodium tripolyphosphate, whereas the latter has 3.50 pounds of sodium hydroxide.

Three sets of paired hams were pumped with 10% pump (10 pounds of pickle liquor per 100 pounds of ham) so that the left ham from each of the 3 sets was pumped with Pickle Liquor "A" and the right ham of each set was pumped with Pickle Liquor "B."

The hams were then rubbed lightly with Superior Bacon Mix (i.e., 70.13% sodium chloride, 28.25% sugar, 1.02% sodium nitrite, and 0.67% sodium nitrate) and held in the cure for 5 days at 45° F., followed by boning, canning, and cooking. The hams were held in the storage cooler at 45° F. for 6 days, after which the cans were opened and the hams were evaluated.

The data shown in Table 1 below were obtained from the analysis of the pickle liquors and hams.

TABLE 1

| | Pickle liquor A | Pickle liquor B |
|---|---|---|
| pH of pickle liquor | 7.65 | 11.45 |
| Salometer, degrees | 85.00 | 76.00 |
| Average pH of finished ham | 6.17 | 6.45 |
| Average residual nitrite in finished ham, p.p.m. | 68.00 | 114.50 |
| Average shrink of three sets of paired hams, percent | 10.70 | 17.70 |

The above data of Table 1 above show that Pickle Liquor "A," with 16 pounds of sodium tripolyphosphate, caused substantially less shrink and lower pH than Pickle Liquor "B," with 3.5 pounds of sodium hydroxide, and Pickle Liquor "B" caused a poorer utilization of nitrate as evidence by the presence of more residual nitrite.

The tests were repeated with 2 different sets of hams, and the data shown in Table 2 below were obtained from the analysis of these sets of hams.

TABLE 2

Average shrink of hams

| | Percent |
|---|---|
| Pickle liquor "A" | 11.2 |
| Pickle liquor "B" | 16.3 |

The data shown in Table 2 above corresponds with the data in Table 1.

The hams were sliced and it was noted that the inside color of the hams treated with Pickle Liquor "A" was slightly better than the color of the hams treated with Pickle Liquor "B." After tasting the hams, one of the five tasters thought there was a slight bitterness in the hams treated with Pickle Liquor "B."

Portions of the ham were sliced and packaged in vacuum and the packages were exposed to fluorescent light at 75 to 90 foot candles. After the first day of exposure, the slices showed considerable graying, regardless of whether the hams were treated with Pickle Liquor "A" or Pickle Liquor "B"; however, a slightly grayer color was noticed with regard to the hams treated with Pickle Liquor "B." After one or two days' exposure to the fluorescent light, the original color returned. The color remained after ten days of exposure.

EXAMPLE 2

The following pickle liquors were prepared.

Pickle liquor "A"

Water: 50 gallons (416.5 pounds)
Sodium chloride: 71 pounds, 4 ounces
Cane sugar: 25 pounds
Prague powder: 13 pounds, 12 ounces
Sodium tripolyphosphate: 8 pounds
Sodium hydroxide: 2 pounds Pickle liquor "B"

Water: 50 gallons (416.5 pounds)
Sodium chloride: 71 pounds, 4 ounces
Cane sugar: 25 pounds
Prague powder: 13 pounds, 12 ounces
Sodium tripolyphosphate: 16 pounds It should be noted that Pickle Liquor "A" differs from Pickle Liquor "B" in that the former has 8 pounds of sodium tripolyphosphate and 2 pounds of sodium hydroxide, whereas the latter has 16 pounds of sodium tripolyphosphate.

Three sets of paired hams were pumped with 10% pump so that the right ham from each of the 3 sets was pumped with Pickle Liquor "A" and the left ham of each set was pumped with Pickle Liquor "B."

The hams were then rubbed lightly with Superior Bacon Mix and held in the cure for 5 days, followed by boning, canning, and cooking. The hams were held in the storage cooler for 7 days, after which the cans were opened and the hams were evaluated.

The data shown in Table 3 below were obtained.

TABLE 3

| | Pickle liquor A | Pickle liquor B |
|---|---|---|
| pH of Pickle Liquor | 11.20 | 7.32 |
| Salometer, degrees | 76.00 | 82.00 |
| pH of ground ham | 6.35 | 6.20 |
| Residual nitrite in the ground ham, p.p.m. | 91.00 | 74.00 |
| Average shrink, percent | 7.73 | 8.17 |

The hams pumped with Pickle Liquor "A," with 8 pounds of sodium tripolyphosphate and 2 pounds of sodium hydroxide, caused a slightly higher pH, but somewhat lower shrink than hams pumped with Pickle Liquor "B," with 16 pounds of soidum tripolyphosphate. Pickle Liquor "A" did not produce a bitter taste in the finished ham, which is sometimes associated with sodium hydroxide, and it appeared to produce a somewhat tastier flavor than Pickle Liquor "B."

EXAMPLE 3

The following pickle liquors were prepared.

Pickle liquor "A"

Water: 50 gallons (416.5 pounds)
Sodium chloride: 71.25 pounds
Cane sugar: 25.00 pounds
Prague powder: 13.00 pounds, 12 ounces
Sodium tripolyphosphate: 8.00 pounds
Sodium hydroxide: 2.00 pounds Pickle liquor "B"

Water: 50 gallons (416.5 pounds)
Sodium chloride: 71.25 pounds
Cane sugar: 25.00 pounds
Prague powder: 13.00 pounds, 12 ounces
Sodium tripolyphosphate: 16.00 pounds It should be noted that Pickle Liquor "A" differs from Pickle Liquor "B" in that the former has 8 pounds of sodium tripolyphosphate and 2 pounds of sodium hydroxide, whereas the latter has 16 pounds of sodium tripolyphosphate.

Two sets of paired hams were pumped with 10% pump so that the right ham from each of the 2 sets was pumped with Pickle Liquor "A" and the left ham of each set was pumped with Pickle Liquor "B."

The hams were then rubbed lightly with Superior Bacon

Mix and held in the cure for 5 days, followed by boning, canning, and cooking. The hams were held in the storage cooler for 7 days, after which the cans were opened and the hams were evaluated.

The data shown in Table 4 below were obtained.

TABLE 4

|  | Pickle liquor A | Pickle liquor B |
|---|---|---|
| pH of pickle liquor | 11.80 | 7.32 |
| Salometer, degrees | 77.00 | 82.00 |
| pH of ground ham | 6.50 | 6.20 |
| Residual nitrate, p.p.m | 146.00 | 98.00 |
| Average shrink, percent | 7.67 | 9.77 |

The hams pumped with Pickle Liquor "A," with 8 pounds of sodium tripolyphosphate and 2 pounds of sodium hydroxide, did not have a bitter taste, and had less shrink and a somewhat higher pH than the hams treated with Pickle Liquor "B," with 16 pounds of sodium tripolyphosphate.

EXAMPLE 4

The following pickle liquors were prepared.

Pickle liquor "A"

Water: 50 gallons (416.5 pounds)
Sodium chloride: 71 pounds, 4 ounces
Cane sugar: 25 pounds
Prague powder: 13 pounds, 12 ounces
Sodium tripolyphosphate: 8 pounds
Sodium hydroxide: 3 pounds Pickle liquor "B"

Water: 50 gallons (416.5 pounds)
Sodium chloride: 71 pounds, 4 ounces
Cane sugar: 25 pounds
Prague powder: 13 pounds, 12 ounces
Sodium tripolyphosphate: 16 pounds It should be noted that Pickle Liquor "A" differs from Pickle Liquor "B" in that the former has 8 pounds of sodium tripolyphosphate and 3 pounds of sodium hydroxide, whereas the latter has 16 pounds of sodium tripolyphosphate.

Three sets of paired hams were pumped with 10% pump so that the right ham from each of the 3 sets was pumped with Pickle Liquor "A" and the left ham of each set was pumped with Pickle Liquor "B."

The hams were then rubbed lightly with Superior Bacon Mix and held in the cure for 5 days, followed by boning, canning, and cooking. The hams were held in the storage cooler for 7 days, after which the cans were opened and the hams were evaluated.

The data shown in Table 5 below were obained.

TABLE 5

|  | Pickle liquor A | Pickle liquor B |
|---|---|---|
| pH of pickle liquor | 11.80 | 7.32 |
| Salometer, degrees | 77.00 | 82.00 |
| pH of ground ham | 6.35 | 6.20 |
| Residual nitrate in the ground ham, p.p.m | 109.00 | 79.00 |
| Average shrink, percent | 8.28 | 8.70 |

In conclusion, Pickle Liquor "A," with 8 pounds of sodium tripolyphosphate and 3 pounds of sodium hydroxide, produced in ham less shrink than Pickle Liquor "B," with 16 pounds of sodium tripolyphosphate. Further, Pickle Liquor "A" produced a slight bitterness according to some of the tasters.

EXAMPLE 5

The following pickle liquors were prepared.

Pickle liquor "A"

Water: 50 gallons (416.5 pounds)
Sodium chloride: 71 pounds, 4 ounces
Can sugar: 25 pounds
Prague powder: 13 pounds, 12 ounces
Sodium tripolyphosphate: 16 pounds
Sodium hydroxide: 2 pounds Pickle liquor "B"

Water: 50 gallons (416.5 pounds)
Sodium chloride: 71 pounds, 4 ounches
Cane sugar: 25 pounds
Prague powder: 13 pounds, 12 ounces
Sodium tripolyphosphate: 8 pounds
Sodium hydroxide: 2 pounds Pickle liquor "C"

Water: 50 gallons (416.5 pounds)
Sodium chloride: 71 pounds, 4 ounces
Cane sugar: 25 pounds
Prague powder: 13 pounds, 12 ounces
Sodium tripolyphosphate: 16 pounds It should be noted that Pickle Liquors "A" through "C" differ in composition as shown in Table 6 below.

TABLE 6

|  | Pickle liquors | | |
|---|---|---|---|
|  | A | B | C |
| Sodium tripolyphosphate, pounds | 16 | 8 | 16 |
| Sodium hydroxide, pounds | 2 | 2 | --- |

Three sets of paired hams were pumped with 10% pump so that the left ham from each of the 3 sets was pumped with Pickle Liquor "C" and the right ham of each set was pumped with Pickle Liquor "A."

Two additional sets of paired hams were pumped with 10% pump so that the left ham from each of the 2 sets was pumped with Pickle Liquor "C" and the right ham of each set of hams was pumped with Pickle Liquor "B."

Thus, the pumping procedure shown in Table 7 below was followed.

TABLE 7

|  | Left ham | Right ham |
|---|---|---|
| Ham number: | | |
| 1 | C | A |
| 2 | C | A |
| 3 | C | A |
| 4 | C | B |
| 5 | C | B |

The hams were then rubbed lightly with Superior Bacon Mix and held in the cure for 5 days, followed by boning, canning, and cooking. The hams were held in the storage cooler for 7 days, after which the cans were opened and the same were evaluated.

The average shrinkage data shown in Table 8 below were obtained.

TABLE 8

Average shrink, percent:
  Pickle liquor A, 9.36
  Pickle liquor C, 11.50
  Pickle liquor B, 10.39
  Pickle liquor C, 10.52

The hams treated with each of the pickle liquors had comparable color, although Pickle Liquors "A" and "B" appeared to produce a slightly better color than Pickle Liquor "C." The hams produced with Pickle Liquors "A" and "B" were considered to have excellent taste and were comparable to the hams produced with Pickle Liquor "C."

In conclusion, Pickle Liquor "A," in particular, with 16 pounds of sodium tripolyphosphate and 2 pounds of sodium hydroxide, as well as Pickle Liquor "B," with 8 pounds of sodium tripolyphosphate and 2 pounds of sodium hydroxide, produced less shrink than Pickle Liquor "C" with 16 pounds of sodium tripolyphosphate.

EXAMPLE 6

The following pickle liquors were prepared.

Pickle liquor "A"

Water: 50 gallons (416.5 pounds)
Fine flake salt: 71 pounds, 4 ounces
Cane sugar: 25 pounds
Prague powder: 13 pounds, 12 ounces
Sodium tripolyphosphate: 32 pounds
Sodium hydroxide: 2 pounds

Pickle liquor "B"

Water: 50 gallons (416.5 pounds)
Fine flake salt: 71 pounds, 4 ounces
Cane sugar: 25 pounds
Prague powder: 13 pounds, 12 ounces
Sodium tripolyphosphate: 16 pounds
Sodium hydroxide: 2 pounds, 8 ounces

Pickle liquor "C"

Water: 50 gallons (416.5 pounds)
Fine flake salt: 71 pounds, 4 ounces
Cane sugar: 25 pounds
Prague powder: 13 pounds, 12 ounces
Sodium tripolyphosphate: 16 pounds
Sodium hydroxide: 2 pounds

Pickle liquor "D"

Water: 50 gallons (416.5 pounds)
Fine flake salt: 71 pounds, 4 ounces
Cane sugar: 25 pounds
Prague powder: 13 pounds, 12 ounces
Sodium tripolyphosphate: 32 pounds

Pickle liquor "E"

Water: 50 gallons (416.5 pounds)
Fine flake salt: 71 pounds, 4 ounces
Cane sugar: 25 pounds
Prague powder: 13 pounds, 12 ounces
Sodium tripolyphosphate: 16 pounds It should be noted that Pickle Liquors "A" through "E" differ in composition as shown in Table 9 below.

TABLE 9

| | Pickle liquors | | | | |
|---|---|---|---|---|---|
| | A | B | C | D | E |
| Sodium tripolyphosphate, pounds | 32 | 16.0 | 16 | 32 | 16 |
| Sodium hydroxide, pounds | 2 | 2.5 | 2 | | |

Further, these pickle liquors had the characteristics shown in Table 10 below.

TABLE 10

| | Pickle liquors | | | | |
|---|---|---|---|---|---|
| | A | B | C | D | E |
| pH | 10.91 | 10.98 | 10.9 | 7.42 | 7.5 |
| Salometer, degrees | 88.00 | 81.00 | 81.0 | 88.00 | 81.0 |

Twelve sets of paired hams were pumped with 10% pump so that the right ham from each of the 12 sets was pumped with the same pickle liquor and the left ham of each of 3 different sets of hams were pumped with another, different pickle liquor. More specifically, Pickle Liquor "D" (the right ham) was compared with Pickle Liquors "A," "B," "C," and "E" (the left ham). The liquors that were compared followed the pumping procedure shown in Table 11 below.

TABLE 11

| | Left ham | Right ham |
|---|---|---|
| Ham number: | | |
| 1 | E | D |
| 2 | E | D |
| 3 | E | D |
| 4 | C | D |
| 5 | C | D |
| 6 | C | D |
| 7 | B | D |
| 8 | B | D |
| 9 | B | D |
| 10 | A | D |
| 11 | A | D |
| 12 | A | D |

The hams were rubbed lightly with Superior Bacon Mix and held in the cure for 4 days, followed by boning, vacuum canning, cooking, and chilling. The hams were held in cooler storage for 6 days, after which the cans were opened and the hams were evaluated.

The average shrink data shown in Table 11A below were obtained.

TABLE 11A

Average shrink, percent:
  Pickle liquor A, 9.60
  Pickle liquor D, 10.2
  Pickle liquor B, 7.80
  Pickle liquor D, 9.6
  Pickle liquor C, 8.08
  Pickle liquor D, 8.6
  Pickle liquor E, 10.20
  Pickle liquor D, 8.4

The hams that were treated with Pickle Liquors "A" and "D" having the 32 pounds of sodium tripolyphosphate provided some indication of a phosphate taste to most of the tasters. Some of the tasters thought that the hams treated with Pickle Liquor "B" (16 pounds of sodium tripolyphosphate and 2.5 pounds of sodium hydroxide) had a slightly bitter taste, whereas the hams treated with Pickle Liquor "C" (16 pounds of sodium tripolyphosphate and 2 pounds of sodium hydroxide) had an excellent flavor.

In conclusion, Pickle Liquor "B," in particular, with 16 pounds of sodium tripolyphosphate and 2.5 pounds of sodium hydroxide, and to a somewhat lesser degree, Pickle Liquor "A," with 32 pounds of sodium tripolyphosphate and 2 pounds of sodium hydroxide, and to a still lesser degree, Pickle Liquor "C," with 16 pounds of sodium tripolyphosphate and 2 pounds of sodium hydroxide, produced in ham less shrink than Pickle Liquor "D" with 32 pounds of sodium tripolyphosphate. Pickle Liquor "E," with 16 pounds of sodium tripolyphosphate, produced more shrink in ham than Pickle Liquor "D" which had 32 pounds of sodium tripolyphosphate.

EXAMPLE 7

The following blend was prepared:

Sodium tripolyphosphate: 80 gm.
Sodium hydroxide: 20 gm.
Water: 50 cc.

The blend was dried over night in an oven at 175° F. The resulting dried cake was analyzed and it was found that almost all of the sodium tripolyphosphate had reverted to sodium pyrophosphate as determined by paper chromatography and altered titration curves. (In this and other examples below, a 1-gram sample was dissolved in 100 cc. of water and the solution was titrated with 0.1 N sulfuric acid to a pH of 3.8.)

These results indicate that the presence of water (e.g., moisture) tends to make a sodium tripolyphosphate-sodium hydroxide blend unstable.

EXAMPLE 8

The following tests were conducted for the purpose of evaluating the sodium tripolyphosphate-sodium hydroxide composition of U.S. Pat. 3,104,978 to Eugene V. Elder, Jr. (see Example 22).

A blend of the following materials was prepared:

|  | Grams |
|---|---|
| Sodium tripolyphosphate | 500 |
| Sodium hydroxide | 42 |
| Water | 78 |

The foregoing weight proportions conform with the weight (total) proportions of the same ingredients set forth in Example 1 of U.S. Pat. 3,104,978.

The sodium hydroxide was added as 84 grams of a 50% aqueous solution and 36 grams of additional water were added to provide a total of 78 grams of water.

The blend was divided into 8 equal parts and placed in tightly sealed jars at room temperature. The jars were placed in a closed container and stability studies were made to determine the degree of reversion of the sodium tripolyphosphate to sodium ortho- or pyrophosphates.

The free or unreacted sodium hydroxide was determined in two ways. In the first method of 1-gram sample was extracted with 100 ml. of ethyl alcohol, and the extract was titrated with 0.1 N sulfuric acid to a pH of 7.0. This method determines the sodium hydroxide content, since the phosphates, sodium tripolyphosphate and its reversion products (e.g., sodium ortho- and pyrophosphates), are not soluble in alcohol. In the second method, 100 ml. of a 1% aqueous solution of the same was titrated with 0.1 N sulfuric acid to a pH of 10.5. This method is a measurement for sodium hydroxide as long as no sodium orthophosphate is present. When the latter begins to appear in significant amounts (as a result of reversion of sodium tripolyphosphate), this method will yield higher results than the first one. The moisture content of the material was determined by drying a sample for 6 hours in a vacuum oven at 50° C. (122° F.). The phosphate composition was determined by proper chromatography using appropriate standards and titration curves.

Table 12 below shows the analysis of the blend on the day it was prepared.

TABLE 12

|  | Determined by analysis | Calculated from known ingredients |
|---|---|---|
| Alcohol-soluble sodium hydroxide, percent | 6.20 | 6.71 |
| Titratable sodium hydroxide, percent | 5.60 |  |
| Moisture, percent | 11.90 | 12.60 |
| Phosphate composition, percent: |  |  |
| Tripolyphosphate | 95.00 |  |
| Pyrophosphate | 5.00 |  |
| Orthophosphate | 0.00 |  |
| pH (1% solution) | 11.61 |  |

Table 13 below shows the analyses of the blend at periodic intervals. The analysis was made using the above referred to methods. The stability of the prepared composition was determined at 3- to 5-day intervals. Fresh jars were opened each time to eliminate the possibility of breakdown due to frequent handling.

The results in Table 13 below show that 92% of the calculated amount of free sodium hydroxide can be extracted from the composition on the day of manufacture,

TABLE 13

| Length of storage | pH (1% solution) | Percent NaOH (alcohol-soluble) | Percent of total NaOH (still unreacted) | Percent titratable alkalinity (to pH 10.5) | Percent phosphate composition |  |  |
|---|---|---|---|---|---|---|---|
|  |  |  |  |  | Sodium tripoly-phosphate | Sodium pyro-phosphate | Sodium ortho-phosphate |
| 0 days | 11.61 | 6.20 | 92 | 5.60 | 95 | 5 | 0 |
| 3 days |  |  |  |  | 90 | 5 | 5 |
| 5 days | 11.59 | 4.95 | 74 | 4.80 | 80 | 10 | 10 |
| 10 days | 11.52 | 4.28 | 64 | 4.40 | 80 | 10 | 10 |
| 14 days | 11.50 | 3.41 | 51 | 4.04 | 75 | 20 | 5 |
| 24 days | 11.19 | 1.68 | 25 | 3.01 | 60 | 30 | 10 | and 24 days later, 25% of the free sodium hydroxide remained unreacted. The remaining 75% of free sodium hydroxide reacted with sodium tripolyphosphate, resulting in reversion of the sodium tripolyphosphate to sodium ortho- and pyrophosphates, as evidenced above. These results also indicate that the presence of water (e.g., moisture) tends to make a sodium tripolyphosphate-sodium hydroxide blend unstable, particularly with the passage of time.

EXAMPLE 9

One hundred gram samples of a blend of 80% sodium tripolyphosphate and 20% of sodium hydroxide were placed in beakers immersed in a heated oil bath and the blends were agitated with a paddle-type stirrer for 30 minutes at the temperatures shown in Table 14 below to produce the results shown therein.

Table 14

| Temperature of heating: | Reversion of sodium tripolyphosphate, percent |
|---|---|
| 47° C. (116° F.) | 0 |
| 61° C. (140° F.) | 10 |
| 75° C. (167° F.) | 50 |

The results shown in Table 14 above point out the importance of controlling the temperature, otherwise reversion occurs. At a temperature of 167° F., within 30 minutes up to 50% of the sodium tripolyphosphate reverted to sodium ortho- and pyrophosphates as determined by paper chromatography and titration (see Examples 7 and 8). Even at 140° F., some reversion occurred. When this same experiment was conducted at 116° F., no reaction occurred between the sodium hydroxide and the sodium tripolyphosphate.

Again, this shows that too high an increase in the temperature of the blend can cause substantial reversion.

EXAMPLE 10

A blend was made by mixing 80% powdered, anhydrous sodium tripolyphosphate and 20% powdered sodium hydroxide. A major proportion of both ingredients passed through a 100-mesh screen. The samples were placed in a muffle furnace at the temperatures indicated in Table 15 below for 30 minutes, and the degree of reversion of the sodium tripolyphosphate to sodium ortho- and pyrophosphates was determined by paper chromatography and titration (see Examples 7 and 8).

TABLE 15

| Muffle temperature: | Percent moisture loss from the sample | Reversion of sodium tripoly-phosphate, percent |
|---|---|---|
| 600° C. | 6.0 | 60 |
| 500° C. | 5.8 | 40 |
| 400° C. | 5.2 | 25 |
| 300° C. | 5.0 | 20 |
| 200° C. | 3.7 | 15 |
| 110° C. | 1.7 | 10 |
| Control (no heat) |  |  |

The results given in Table 15 above show that 15% reversion occurred when the blend was heated to a temperature of 200° C. and substantial reversion occurs and increases at higher temperatures. The moisture loss by the sample is a product of the reaction in which the sodium tripolyphosphate reverts to sodium ortho- and pyrophosphates.

The above results show the need of controlling the temperature of blends of sodium tripolyphosphate and sodium hydroxide.

EXAMPLE 11

A blend similar to that used in Example 10 above of 20% sodium hydroxide and 80% sodium tripolyphosphate was prepared. 3.5 gram samples of the blend were added to a one-inch die and placed in a Carver press having a tube fitted with a one-inch diameter piston. The pellets formed on compaction had a thickness of approximately ⅛ inch. The compaction was carried out at room temperature in the presence of no added moisture. Several pellets were made under each condition of compaction. The results of the compaction are given in Table 16 below.

TABLE 16

| | Observation of fragility of compacted product | Degree of reversion of sodium tripolyphosphate, percent |
|---|---|---|
| Pressure (p.s.i.): | | |
| 2,000 | Poor pellets | 0 |
| 3,000 | Good pellets* | 0 |
| 6,000 | do.* | 0 |
| 9,000 | do.* | 5 |
| 12,000 | do.* | 40 |

*Not fragile.

The results shown in Table 16 above show that if excessive pressure is applied, even at room temperature, the sodium hydroxide may react with the sodium tripolyphosphate to revert the sodium tripolyphosphate to sodium ortho- and pyrophosphates, as evidenced by paper chromatography and titration (see Example 7).

The respective samples of pellets were broken down in size, and the resulting products which passed through a 5-mesh screen and remained on a 40-mesh screen were stored for 3 weeks at room temperature. No further sign of reversion occurred with those pellets which exhibited no substantial reversion immediately after compaction.

EXAMPLE 12

A similar experiment was conducted to that set forth in Example 11 in that a blend of 80% of sodium tripolyphosphate and 20% of sodium hydroxide was made. The blend was placed in an oven to a temperature of 110° C. for 2 minutes, which warmed the sample. The sample was then placed in the Carver press. Compaction was conducted at 6,000 p.s.i. to yield a 10% reversion of the sodium tripolyphosphate, as compared to the unheated sample of Example 11, which exhibited no reversion. When 12,000 p.s.i. were applied to a sample, the reversion was substantial, amounting to 50%.

The results indicate that the use of higher temperatures and/or compaction pressures, which cause a temperature rise, can induce substantial reversion of sodium tripolyphosphate to sodium ortho- and pyrophosphates, as evidenced by paper chromatography and titration (see Examples 7 and 8).

EXAMPLE 13

A pilot run was made by preparing a 1,000-pound blend of 20% of powdered sodium hydroxide and 80% of powdered, anhydrous sodium tripolyphosphate. The blend was added to a compaction system having counter-revolving rolls (not water-cooled rolls) 8 inches in diameter and 6 inches long (known as a Fitzpatrick chilsonator). The blend was carried up to the compactor using an upwardly inclined and upwardly feeding screw conveyor, and was carried down to the rolls by a vertical screw feeder. The vertical screw feeder applied some pressure to the blend, but not enough to effect compaction of the blend to be compacted. During the transfer and compaction by the rolls, it was noted that a great deal of heat was generated and the temperature of the product went up to 150° C. By paper chromatography analysis, it was found that 90% of the sodium tripolyphosphate reverted to sodium ortho- and pyrophosphates, as evidenced by paper chromatography and titration (see Examples 7 and 8).

A blend was also made in which 702 pounds of powdered, anhydrous sodium tripolyphosphate was admixed with 167 pounds of powdered sodium hydroxide, 79.2 pounds of sodium nitrite, and 52.5 pounds of sodium nitrate. This blend was also put into the compaction system and a great amount of heat developed during conveying and compaction and reversion occurred.

These results indicate the need or desire for temperature control of the blend before and during compaction (see Example 9).

EXAMPLE 14

A blend of 20% of powdered sodium hydroxide and 80% of powdered, anhydrous sodium tripolyphosphate was mechanically mixed for a pilot run with a Fitzpatrick chilsonator having 10-inch diameter, counter-rotating, water-cooled rolls 7 inches long. The blend was fed into an overhead hopper, was fed through a horizontal screw conveyor less than 1 foot long to a downwardly feeding vertical screw feeder approximately 1 foot long. The product was then fed downwardly by the vertical screw feeder directly into the counter-rotating compaction rolls. Cooling water at a temperature of 68° F. was fed through the lower half of the vertical screw feeder and the rolls. The horizontal screw conveyor revolved at 120 r.p.m., the vertical screw feed rotated at 1,200 r.p.m., and the rolls were revolved at 12 r.p.m.

Four different 30 or 35-pound batches (samples "3A" through "3D") were prepared and the results are shown in Table 17 below.

TABLE 17

| | Samples | | | |
|---|---|---|---|---|
| | 3D | 3A | 3B | 3C |
| Air pressure to the rolls (p.s.i.) | 12 | 16 | 30 | 35 |
| Oil pressure to the rolls (p.s.i.) | 400 | 600 | 1,000 | 1,100 |
| Total pressure on the rolls (pounds per linear inch) | 15,000 | 20,300 | 38,500 | 44,000 |
| Specific pressure on the 7-inch rolls (lbs. per linear inch) | 2,143 | 2,900 | 5,500 | 6,286 |
| Initial temperature of the phosphate-sodium hydroxide mix (° F.) | 74 | 74 | 74 | 74 |
| Temperature of the product taken immediately from the compactor | 78 | 84 | 90 | 86 |
| Temperature in the drum 1½ hours later (° F.) | 82 | 86 | 95 | 93 |
| Degree of compaction | Poor | Good | Good | Good |
| Fragility of compacted product | (¹) | (²) | (³) | (⁴) |
| Weight of chips cracked in the laboratory (gms.) | 181 | 227 | 234 | 235 |
| Material through a 5-mesh screen and on a 40-mesh screen (gms.) | 149 | 191 | 203 | 207 |
| Fines through a 40-mesh screen (gms.) | 32 | 36 | 32 | 28 |
| Percent fines | 18 | 16 | 14 | 12 |

[1] Fragile.
[2] Fair.
[3] Hard.
[4] Hardest.

In each case, about one minute was required for the compaction of the 30- or 35-pound batches. No visual evidence of reversion, as evidenced by lack of evolution of heat or steam, could be detected in any of the four samples. This lack of reversion was confirmed by paper chromatography and titration (see Examples 7 and 8).

The results shown in Table 17 above indicate that by using the proper equipment and controlling the temperature of the blend before and during compaction, compacted granules can be made without substantial reversion of sodium tripolyphosphate.

EXAMPLE 15

Another larger scale run was made using the Fitzpatrick chilsonator equipment used in the pilot run of Example 14, feeding 1,000 pounds of a blend of 80% of powdered, anhydrous sodium tripolyphosphate and 20% of powdered sodium hydroxide to the compaction rolls. The temperature of the blend was 97° F. Upon compaction at a pressure of 5,500 to 6,286 pounds per linear inch, the temperature of the resulting compacted granules rose to about 112° F. No substantial reversion of the sodium tripolyphosphate resulted, as determined by paper chromatography and titration (see Examples 7 and 8).

The bulk of the compacted granules was placed in 250-pound drums (i.e., drums for storing and shipping 250 pounds of compacted granules). It was noted that within about 30 minutes, steam was evolved from the granules and the temperature of the granules reached about 280° F. Apparently sufficient heat was developed during compaction to trigger the reversion reaction.

The results appear to indicate the need or desirability for not feeding the blend to the rolls at a temperature above about 80° F., not allowing the compacted granules to reach a temperature very much above about 100° F. during or after compaction, and cooling the compaction rolls.

Further, it is desirable not to treat the blend at a high humidity.

EXAMPLE 16

One thousand pounds of an alkaline curing salt blend was made up by mechanically mixing the following proportions of materials:

| | Parts by wt. |
|---|---|
| Powdered, anhydrous sodium tripolyphosphate | 8 |
| Powdered sodium hydroxide | 2 |
| Sodium nitrite | 0.8 |
| Sodium nitrate | 0.6 |
| Sodium chloride | 1.1 |

12.5 pounds of the solid blend could be used to prepare 50 gallons of a pickle liquor suitable for use as a 10% pump.

The initial temperature of the solid curing salt blend was 97° F. It was subjected to compaction with the chilsonator equipment described in Example 14, using a pressure of 5,500 to 6,286 pounds per linear inch. Immediately after compaction, the temperature of the blend was 108° F. Small samples of the compacted blend showed no signs of reversion, as evidenced by the lack of evolution of heat or steam, and the product from the small compacted samples was put in 250-pound bulk drums. No subsequent heat formation was noticed, and analyses using paper chromatography and titration (see Examples 7 and 8) the following day showed no signs of substantial reversion.

The granules were then added to water and they dissolved readily or quickly. During the solution of these granules, it appears that the sodium hydroxide dissolves, developing heat, which rapidly disintegrates the granules, thus speeding the solution of the blend in the water.

A sample of the compacted blend was ground in a mortar with a pestle so that a major proportion of the blend would pass through a 5-mesh screen and be retained on a 40-mesh screen (the fines could be reblended and subjected to compaction). The amount of sodium nitrite and sodium hydroxide were determined by analyses as shown in Table 18 below.

TABLE 18

| | Sodium nitrite | Sodium hydroxide |
|---|---|---|
| Theoretical, percent | 6.40 | 16.0 |
| Found, percent | 6.45 | 16.5 |

The analyses shown in Table 18 above show that the compacted blend had the analyses as expected from the theoretical values.

The compaction bonded the sodium nitrite to the sodium tripolyphosphate and sodium hydroxide, and, as shown in Table 18A below, each particle size fraction of the compacted material had comparable analyses.

TABLE 18A

| | Percent sodium nitrite |
|---|---|
| Theoretical | 6.40 |
| Original mechanical mix | 6.20 |
| Compacted material cracked: | |
| Through 40-mesh screen | 6.06 |
| Through 5-mesh screen and on 40-mesh screen | 6.45 |

EXAMPLE 17

A pickle liquor was prepared with the following composition:

Water: 50 gallons (416.5 pounds)
Sodium chloride: 71 pounds, 4 ounces
Cane sugar: 25 pounds
Prague powder: 13 pounds, 12 ounces 4.2 grams of calcium chloride were added to two 6.5-pound samples of the pickle liquor to increase the calcium content of the pickle liquor to about 500 p.p.m., which is often present in commercial lixated brines.

Two ounces of compacted Sample "3B" of Example 14 (80% of powdered, anhydrous sodium tripolyphosphate and 20% of powdered sodium hydroxide), and 3.2 ounces of sodium tripolyphosphate were individually added to each one of the two 6.5-pound samples of pickle liquor (equivalent to 10 pounds of Sample "3B" and 16 pounds of sodium tripolyphosphate added to the 50 gallons of pickle liquor). Both pickle liquor samples were clear and had only a trace of precipitate, thus indicating the good solubility characteristics in the pickle liquor of Sample "3B," as well as sodium tripolyphosphate. The pickle liquors were stored at 45° F. for 1 week.

EXAMPLE 18

Several 300-pound lots of separate blends having (a) 80% of powdered, anhydrous sodium tripolyphosphate and 20% of powdered sodium hydroxide, and (b) the alkaline curing salt blend of Example 16 were compacted using the counter-rotating compaction rolls. The compaction rolls had a diameter of 30 inches, were 8 inches long, were not water-cooled, were rotated at 2 r.p.m., and applied a pressure of 15,000 pounds per linear inch.

It was found that these rolls behave like the Fitzpatrick chilsonator rolls of Example 14 above in these respects:

(1) Both types of equipment can produce a compacted product suitable for the manufacture of satisfactory compacted granules; and, (2) Both types of equipment develop enough heat of compaction in an ordinary atmosphere to trigger a violent reversion of the compressed product if the blend and equipment are improperly handled or used.

From this and previous tests and Example 21 below, it was learned that proper manufacturing procedure for producing compacted granules should involve the following:

(a) A low humidity environment at moderate temperatures (e.g., below about 80° F.);

(b) A blend similarly held at controlled temperatures (e.g., below about 80° F. prior to compaction);

(c) Not allowing the temperature of the blend to increase too high during compaction (e.g., below or not exceeding about 110° F.); and, (d) Maintaining the compacted product at a sufficiently low temperature prior to bulk packing so as to dissipate any latent heat which might trigger reversion.

Samples of the two compacted blends were ground in a mortar with a pestle so that a major proportion of the blend would pass through a 5-mesh screen and be returned on a 40-mesh screen. (The fines could be reblended and subjected to compaction.) The analyses of the blends are set forth in Table 19 below.

TABLE 19

|  | Compacted blend of 80% sodium tripolyphosphate and 20% sodium hydroxide | Compacted blend of Example 16 | |
|---|---|---|---|
|  |  | Nitrite | Sodium hydroxide |
| Theoretical, percent | 20 | 6.4 | 16.0 |
| Found, percent | 19 | 6.2 | 15.4 |

EXAMPLE 19

Blends of Compositions "A," "B," and "C" were prepared as shown in Table 20 below.

TABLE 20

|  | Compositions | | |
|---|---|---|---|
|  | A | B | C |
| Powdered, anhydrous sodium tripolyphosphate, pounds | 8 | 16 | 32 |
| Powdered sodium hydroxide, pounds | 2 | 2 | 2 |

The blends were placed in beakers immersed in a heated oil bath, and the blends were agitated with a paddle type stirrer for 30 minutes at the temperatures in Table 21 below.

TABLE 21

|  | Oil bath temperature | Maximum temperature rise of composition | Time to reach maximum temperature, minutes | Percent reversion of sodium tripolyphosphate (determined by paper chromatography), percent |
|---|---|---|---|---|
| Compositions: |  |  |  |  |
| A | 75° C. (167° F.) | 8.0° C. (14° F.) | 15 | 50 |
| A | 47° C. (116° F.) | 0.5° C. (1° F.) | 25 | 0 |
| B | 76° C. (169° F.) | 10.0° C. (18° F.) | 18 | 33 |
| B | 46° C. (115° F.) | 1.0° C. (2° F.) | 25 | 0 |
| C | 75° C. (167° F.) | 5.0° C. (9° F.) | 23 | 25–33 |

The data in Table 21 above show that the sodium tripolyphosphate tends to revert to sodium ortho- and pyro-phosphates as the level of heat increases. Within the limits tested, the initiation of reversion does not appear to be dependant upon the proportion of sodium hydroxide present in the blend; however, if reversion does occur, the extent of the reversion tends to increase with an increase of the proportion of sodium hydroxide.

Composition "A" was modified by replacing the 80% level of sodium tripolyphosphate with an equal level of two different blends of phosphates which included more highly molecularly dehydrated phosphates, and using 20% of sodium hydroxide. The resulting compositions, Compositions "D" and "E," are shown in Table 22 below. The phosphate blend used for Composition "D" is commercially available sodium hexametaphosphate and the phosphate blend of Composition "E" was "Brifisol" of Joh. A. Benckiser G.m.b.H. The phosphates listed below sodium tripolyphosphate in Table 22 below are more molecularly dehydrated.

TABLE 22

|  | Compositions | |
|---|---|---|
|  | D, percent | E, percent |
| Sodium orthophosphate | 1.20 | 0.48 |
| Sodium pyrophosphate | 2.24 | 11.60 |
| Sodium tripolyphosphate | 2.32 | 25.28 |
| Sodium tetrapolyphosphate | 4.56 | 26.24 |
| Sodium trimetaphosphate | 3.60 | 15.52 |
| Sodium pentapolyphosphate | 4.56 |  |
| Sodium hexapolyphosphate | 3.84 | 0.88 |
| Sodium hexametaphosphate | 57.68 |  |
| Sodium hydroxide | 20.00 | 20.00 |
| Total | 100.00 | 100.00 |

Samples of Compositions "D" and "E" were placed in an oven and heated to the temperatures and for the time periods shown in Table 23 below. The degree of reversion of the particular phosphates subject to reversion was determined by paper chromatography.

TABLE 23

| Heating conditions | Degree of reversion of certain of the phosphates in compositions D and E | Percent moisture loss of compositions D and E |
|---|---|---|
| 30 minutes at 200° C. (392° F.) | Extensive | 6.0 |
| 15 minutes at 200° C. (392° F.) | do | 6.0 |
| 15 minutes at 110° C. (230° F.) | do | 5.1 |

The stability of Compositions "D" and "E" under the conditions used in Example 9 was evaluated by paper chromatography and the data shown in Table 24 below were obtained.

TABLE 24

|  | Oil bath temperature | Maximum temperature rise of sample | Time to reach maximum temperature, minutes | Degree of reversion of certain of the phosphates in compositions D and E |
|---|---|---|---|---|
| Compositions: |  |  |  |  |
| D | 75° C. (167° F.) | (¹) |  | 7 | 90% or more. |
| D | 47° C. (116° F.) | 3° C. (5° F.) | 20 | 0. |
| E | 46° C. (115° F.) | 2° C. (4° F.) | 30 | Slight. |

¹ Much greater than 50° C. (90° F.) (steam evolved).

The oil bath data in Table 24 show that the more highly dehydrated phosphates are less heat stable than sodium tripolyphosphate (limited levels of highly molecularly dehydrated phosphate, if desired, can be included in alkali metal hydroxide-alkali metal tripolyphosphate compositions, provided the resulting compositions have the required stability characteristics). Thus, while 50% of the sodium tripolyphosphate reverted at 75° C. with mild heat evolution, as shown in Example 9, Composition "D" reverted violently and to a greater extent under the same conditions. Further, Composition "E" appears to be even more sensitive to heat and underwent some reversion at 47° C., whereas Composition "D" and the blend of Example 9 (not compacted and had 80% of sodium tripolyphosphate and 20% of sodium hydroxide) were stable at that temperature.

EXAMPLE 20

The compacted blends of 80% sodium tripolyphosphate and 20% sodium hydroxide of Example 14 (Sample "3B"), Example 15, and Example 18 (treated with the rolls used in Example 18), which were prepared at different times, were broken in a mortar with a pestle and were screened (a major proportion passed through a 5-mesh screen and was retained on a 40-mesh screen) to yield 5- to 40-mesh products. The products were stored in bulk using polyethylene liners in the drums at room temperatures for the periods shown in Table 25 below. The results shown in Table 25 below were obtained.

TABLE 25

| | Length of storage, days | Degree of reversion of sodium tripolyphosphate |
|---|---|---|
| Compacted blends of Examples: | | |
| 14 (Sample 3B) | 30 | None. |
| 15 | 27 | Do. |
| 18 (treated with rolls used in example 18) | 20 | Do. | phate composition was determined by paper chromatography using appropriate standards or by titration curves (see Examples 7 and 8).

TABLE 26
[Stability determinations made from 1 lb. sample]

| | Phosphate composition determined by paper chromatography | | | |
|---|---|---|---|---|
| Length of storage | Percent sodium tripoly-phosphate | Percent sodium pyro-phosphate | Percent sodium ortho-phosphate | Phosphate composition determined by alteration of titration curves |
| 0 days | 95 | 5 | Trace | Normal titration pattern. |
| 10 days | | | | Substantially unchanged. |
| 14 days | 95 | 5 | Trace | |
| 21 days | | | | Do. |
| 23 days | 95 | 5 | Trace | |
| 51 days | 95 | 5 | do | |
| 64 days | 95 | 5 | do | |

As is evident from Table 26 above, there was no substantial reversion of the sodium tripolyphosphate after 64 days of storage. Furthermore, after about 24 months of storage, the percent non-reverted sodium tripolyphosphate remained substantially unchanged as determined by paper chromatography.

Similarly, an analysis by paper chromatography of the bulk blend after about 11 months of storage showed that about 95% of the sodium tripolyphosphate remained unreverted.

After the 64-day period of storage mentioned above, 2-gram samples of the blend were exposed in two separate desiccators to atmospheres having a relative humidity, at room temperature, of 6% and 15%, respectively, as provided by diluted sulfuric acid solutions (Handbook of Chemistry and Physics, 39th Edition, p. 2318). After an exposure time of three days, the samples were reweighed to determine moisture pickup and analyzed for reversion. The results are shown in Table 27 below.

TABLE 27
[Effect of controlled humidity on the stability of blend]

| Percent relative humidity of environment | Percent gain in weight after 3 days exposure (moisture) | Appearance | Percent phosphate composition determined by paper chromatography | | |
|---|---|---|---|---|---|
| | | | Sodium ortho-phosphate | Sodium pyro-phosphate | sodium tripoly-phosphate |
| 6 | 3.8 | Free flowing | 0 | 5 | 95 |
| 15 | 7.4 | Clumped | 20 | 40 | 40 |

Table 25 above shows that no reversion was noted, as determined by paper chromatography or titration curves.

EXAMPLE 21

A blend of 80% of sodium tripolyphosphate and 20% of sodium hydroxide was prepared.

Approximately 250 lbs. of a bulk blend of the sodium tripolyphosphate and sodium hydroxide was stored in polyethylene bags for purposes of stability steps. More specifically, approximately equal quantities of that bulk blend were divided into and stored in 5 separate polyethylene bags, and a separate 1 lb. sample of the blend was stored in a tightly closed glass jar which was placed in the laboratory at room temperature.

Table 26 below, shows stability analyses which were made from the 1 lb. sample at periodic intervals. Stability determinations were made to determine the degree of reversion of the sodium tripolyphosphate (to sodium pyrophosphate or sodium orthophosphate). The phos- The data shown in Table 27 above show that the sodium tripolyphosphate present in the blend, when exposed to 6% relative humidity for three days, did not undergo reversion and the blend had only the slight amount of sodium pyrophosphate content generally present in commercial sodium tripolyphosphate. On the other hand, when another portion of the blend was exposed to 15% relative humidity, 55% of the sodium tripolyphosphate reverted to a mixture of ortho- and pyrophosphates.

EXAMPLE 22

The following tests were conducted for the purpose of evaluating sodium tripolyphosphate-sodium hydroxide compositions without added water and with varying amounts of water.

In the tests, the same proportions of the same materials disclosed in Example 1 of U.S. Pat. 3,104,978 to Eugene V. Elder, Jr. were used, and that example was also changed by omitting added water from the composition. Furthermore, the amounts of sodium tripolyphosphate and sodium hydroxide were varied, both without and with varying amounts of added water.

A mixed blend of the following materials was prepared:

Composition "A-1" (12.5% added water)

|  | Grams |
|---|---|
| Sodium tripolyphosphate | 92.3 |
| Sodium hydroxide | 7.7 |
| Water | 14.3 |

The foregoing weight proportions conform with the weight (total) proportions of the same ingredients used in Example 1 of U.S. Pat. 3,104,978.

The blend of Composition "A-1," as well as the other compositions mentioned later below, was divided into about equal parts, all but one of which parts were placed in tightly sealed jars at room temperature; the remaining one part was analyzed for reversion on the day it was prepared. Stability studies were made of all samples to determine the degree of reversion of the sodium tripolyphosphate (to sodium ortho- or pyrophosphates).

The free or unreacted sodium hydroxide of Composition "A-1," as well as other compositions mentioned later below, was determined (Tables 29, 30, 31, 32, 34 and 35) by extracting a 1-gram sample of the blend with 100 ml. of ethyl alcohol, and the extract was titrated with 0.1 N sulfuric acid to a pH of about 7.0. This method determines the sodium hydroxide content, since the phosphates, sodium tripolyphosphate and its reversion products (e.g., sodium ortho- and pyrophosphates), are not soluble in alcohol. The moisture content determinations shown in Tables 28 and 33 below, were determined by drying a sample of the blend for 6 hours in a vacuum oven at 50° C. (112° F.). The phosphate composition of the Composition "A-1," as well as the other compositions shown below, was determined (Tables 29, 30, 31, 32, 34, 35 and 36) by paper chromatography as was used in Example 8.

Table 28 below shows the analysis of the moisture present in Composition "A-1" on the day it was prepared.

TABLE 28

Moisture content of composition "A-1"
(12.5% added water)

Moisture:
    Added water _____ 12.5
    Determined by analysis _____ 13.0

Table 29 below shows the analyses of the stability of Composition "A-1" at periodic intervals. Fresh jars were opened to eliminate or obviate the possibility of breakdown or reversion due to frequent handling; the same procedure was used in the other stability determinations shown later below. The results were as shown in Table 29 below.

TABLE 29

[Stability of Composition A-1 (12.5% added water)]

| Length of storage at room temperature | pH (1% solution) | Percent NaOH (alcohol-soluble) | Percent sodium tripoly-phosphate which reverted |
|---|---|---|---|
| 0 days | 11.40 | * 5.1 | ** 0 |
| 3 days | 11.35 | 4.4 | 5 |
| 5 days | 11.30 | 3.4 |  |
| 7 days | 11.35 | 1.8 | 20 |
| 10 days | 11.20 | 1.2 | 35 |
| 14 days | 11.15 | 0.6 | 35 |
| 21 days | 11.00 | 0.1 | 35 |

\* Initial sodium hydroxide content was 6.7%.
\*\* Initial sodium tripolyphosphate content was 80.8%.

It is evident from Table 29 above that after 5 days of storage, about 49.3% by weight of the sodium hydroxide from Composition "A-1," which was made with 12.5% by weight of added water, had reacted with sodium tripolyphosphate initially used and this resulted in reversion of tripolyphosphate. After 7 days of storage, about 73.1% by weight of the sodium hydroxide had reacted and about 20% by weight of the tripolyphosphate had reverted. Furthermore, after 10 days of storage, about 82.1% by weight of the sodium hydroxide had reacted and about 35% by weight of the tripolyphosphate had reverted.

A mixed blend of the following materials was prepared:

Composition "A-2" (no added water)

|  | Grams |
|---|---|
| Sodium tripolyphosphate | 92.3 |
| Sodium hydroxide | 7.7 |

The foregoing proportion of sodium tripolyphosphate and sodium hydroxide conforms with the proportion used in Example 1 of U.S. Pat. 3,104,978 and Composition "A-1," but no water was added.

Table 30 below shows the analyses of the stability of Composition "A-2" at periodic intervals.

TABLE 30

[Stability of Compositions A-2 (no added water)]

| Length of storage at room temperature | pH (1% solution) | Percent NaOH (alcohol-soluble) | Percent sodium tripoly-phosphate which reverted |
|---|---|---|---|
| 0 days | 11.40 | * 7.7 | ** 0 |
| 3 days | 11.45 | 6.9 | 0 |
| 5 days | 11.50 | 7.2 | 0 |
| 7 days | 11.60 | 6.4 | 0 |
| 10 days | 11.55 | 6.5 | 0 |
| 14 days | 11.55 | 5.9 | 0 |
| 21 days | 11.55 | 6.9 | 0 |

\* Initial sodium hydroxide content was 7.7%.
\*\* Initial sodium tripolyphosphate content was 92.3%.

It is evident from Table 30 above that after 21 days of storage, the sodium tripolyphosphate remained substantially non-reverted, the pH remained substantially unchanged, and the sodium hydroxide remained substantially unchanged.

A mixed blend of the following materials was prepared:

Composition "B-1" (12.5% added water)

|  | Grams |
|---|---|
| Sodium tripolyphosphate | 70.0 |
| Sodium hydroxide | 30.0 |
| Water | 14.3 |

The above proportion of sodium tripolyphosphate and sodium hydroxide (without added water) is disclosed in said application.

Table 31 below shows the anlyses of the stability of Composition "B-1" at periodic intervals.

TABLE 31

[Stability of Composition B-1 (12.5% added water)]

| Length of storage at room temperature | pH (1% solution) | Percent NaOH (alcohol-soluble) | Percent sodium tripoly-phosphate which reverted |
|---|---|---|---|
| 0 day | 11.85 | * 24.8 | ** 0 |
| 3 days | 11.70 | 20.8 | 30 |
| 5 days | 11.75 | 18.9 |  |
| 7 days | 11.85 | 16.3 | 55 |
| 10 days | 11.75 | 15.5 | 55 |
| 14 days | 11.80 | 14.3 | 65 |
| 21 days | 11.75 | 14.1 | 75 |

\* Initial sodium hydroxide content was 26.2%.
\*\* Initial sodium tripolyphosphate content was 61.2%.

It is evident from Table 31 above that after 3 days of storage, about 20.5% by weight of the sodium hydroxide from Composition "B-1," which was made with 12.5% by weight of added water, had reacted with sodium tripolyphosphate initially used and this resulted in reversion of about 30% by weight of the tripolyphosphate. After 5 days of storage, about 27.9% by weight of the sodium hydroxide had reacted. Furthermore, after 7 days of storage, about 37.8% by weight of the sodium hydroxide had reacted and about 55% by weight of the tripolyphosphate had reverted. The presence of an increased proportion of sodium hydroxide in the blend in the presence of moisture tends to increase the reversion of sodium tripolyphosphate.

A mixed blend of the following materials was prepared:

Composition "B-2" (no added water)

| | Grams |
|---|---|
| Sodium tripolyphosphate | 70.0 |
| Sodium hydroxide | 30.0 |

The foregoing weight proportion of materials conforms with the proportion of sodium tripolyphosphate and sodium hydroxide used in Composition "B-1," but there was no added water.

Table 32 below shows the analyses of the stability of Composition "B-2" at periodic intervals.

TABLE 32

[Stability of Composition B-2 (no added water)]

| Length of storage at room temperature | pH (1% solution) | Percent NaOH (alcohol-soluble) | Percent sodium tripoly-phosphate which reverted |
|---|---|---|---|
| 0 day | 11.9 | *31.1 | **0 |
| 3 days | 11.8 | 30.6 | 0 |
| 5 days | 11.8 | 29.4 | |
| 7 days | 11.9 | 26.7 | 0 |
| 10 days | 11.9 | 29.5 | 0 |
| 14 days | 11.9 | 28.8 | 0 |
| 21 days | 11.9 | 28.1 | 0 |

*Initial sodium hydroxide content was 30%.
**Initial sodium tripoylphosphate content was 70%.

It is evident from Table 32 above that after 21 days of storage of Composition "B-2," with no added water, there was no substantial reversion of sodium tripolyphosphate despite the presence of an increased proportion of sodium hydroxide.

A mixed blend of the following materials was prepared:

Composition "C-1" (12.5% added water)

| | Grams |
|---|---|
| Sodium tripolyphosphate | 94.5 |
| Sodium hydroxide | 5.5 |
| Water | 14.3 |

The above proportion of sodium tripolyphosphate and sodium hydroxide (without added water) is disclosed in said application.

Table 33 below shows the analysis of the moisture present in Composition "C-1" on the day it was prepared.

TABLE 33

Moisture content of composition "C-1"
(12.5% added water)

| Moisture: | Percent |
|---|---|
| Added water | 12.5 |
| Determined by analysis | 11.35 |

Table 34 below shows the analyses of the stability of Composition "C-1" at periodic intervals.

TABLE 34

[Stability of Composition C-1 (12.5% added water)]

| Length of storage at room temperature | pH (1% solution) | Percent NaOH (alcohol-soluble) | Percent sodium tripoly-phosphate which reverted |
|---|---|---|---|
| 0 day | 11.35 | *3.7 | **0 |
| 3 days | 11.20 | 2.4 | 0 |
| 5 days | 11.15 | 2.1 | |
| 7 days | 11.20 | 0.9 | 5 |
| 10 days | 11.10 | 0.8 | 25 |
| 14 days | 11.10 | 0.5 | 30 |
| 21 days | 11.10 | 0.2 | 30 |

*Initial sodium hydroxide content was 4.8%.
*Initial sodium tripolyphosphate content was 82.7%.

It is evident from Table 34 above that after 5 days of storage, about 56.3% by weight of the sodium hydroxide from Composition "C-1," which was made with 12.5% by weight of added water, had reacted with the sodium tripolyphosphate initially used; this resulted in reversion of tripolyphosphate. After 10 days of storage, about 83.3% by weight of the sodium hydroxide had reacted and about 25% by weight of the tripolyphosphate had reverted. Furthermore, after 14 days of storage, about 89.6% by weight of the sodium hydroxide had reacted and about 30% by weight of the tripolyphosphate had reverted.

A mixed blend of the following materials was prepared:

Composition "C-2" (no added water)

| | Grams |
|---|---|
| Sodium tripolyphosphate | 94.5 |
| Sodium hydroxide | 5.5 |

The foregoing weight proportion of materials conforms with the proportion of sodium tripolyphosphate and sodium hydroxide used in Composition "C-1," but no water was added.

Table 35 below shows the analyses of the stability of Composition "C-2" at periodic intervals.

TABLE 35

[Stability of Composition C-2 (no added water)]

| Length of storage at room temperature | pH (1% solution) | Percent NaOH (alcohol-soluble) | Percent sodium tripoly-phosphate which reverted |
|---|---|---|---|
| 0 day | 11.50 | *4.7 | **0 |
| 3 days | 11.35 | 4.7 | 0 |
| 5 days | 11.35 | 5.0 | |
| 7 days | 11.45 | 3.9 | 0 |
| 10 days | 11.45 | 4.0 | 0 |
| 14 days | 11.40 | 3.9 | 0 |
| 21 days | 11.45 | 4.4 | 0 |

*Initial sodium hydroxide content was 5.5%.
**Initial sodium tripolyphosphate content was 94.5%.

It is evident from Table 35 above that after 21 days of storage of Composition "C-2," which was made with no added water, the sodium tripolyphosphate thereof remained substantially non-reverted.

A mixed blend of the following materials was perpared.

Composition "D-1" (no added water)

| | Grams |
|---|---|
| Sodium tripolyphosphate | 80 |
| Sodium hydroxide | 20 |

Compositions "D-2," "D-3" and "D-4" were prepared with the same proportion or ratio of sodium tripolyphosphate and sodium hydroxide used in Composition "D-1," except 2%, 5% and 12.5% by weight of water (based on the total weight of the respective compositions), respectively, were added to and mixed with these materials.

Table 36 below shows the analyses of the stability of Compositions "D-1," "D-2," "D-3" and "D-4" at periodic intervals.

TABLE 36

[Stability of Compositions D-1, D-2, D-3, and D-4]

| | Percent sodium tripolyphosphate which reverted | | | |
|---|---|---|---|---|
| Length of storage at room temperature | D-1 (no added water) | D-2 (2% added water) | D-3 (5% added water) | D-4 (12.5% added water) |
| 0 day | 1 0 | 2 0 | 3 2 | 4 5 |
| 3 days | 0 | 0 | 20 | 35 |
| 7 days | 0 | 5 | 30 | 45 |
| 10 days | 0 | | | |
| 14 days | 0 | 5 | 35 | 50 |
| 15 days | | | | |

1 Initial sodium tripolyphosphate content was 80%.
2 Initial sodium tripolyphosphate content was 78.4%.
3 Initial sodium tripolyphosphate content was 76%.
4 Initial sodium tripolyphosphate content was 69.9%.

It is evident from Table 36 above that after 15 days of storage, the sodium tripolyphosphate Composition "D-1," with no added water, remained substantially non-reverted. Substantially the same results were obtained after 15 days of storage with Composition "D-2," which had 2% by weight of water added during its initial preparation. After 3 days of storage of Composition "D-3," which was made with 5% by weight of added water, about 20% by weight of the sodium tripolyphosphate had reverted; after 7 days of storage, about 30% by weight of the sodium tripolyphosphate reverted; after about 14 days of storage, about 35% by weight of the sodium tripolyphosphate reverted. With Composition "D-4," which was prepared with 12.5% by weight of water, after 3 days of storage, about 35% by weight of the sodium tripolyphosphate reverted.

The foregoing detailed description has been given for clearness of understanding only, and no unnecessary limitations should be understood therefrom, as modifications will be obvious to those skilled in the art.

We claim:

1. A particulate composition suitable for use in meat curing media and having good solubility characteristics in a pickle liquor, which composition is substantially free of water and comprises about 70 to 94.5 parts by weight of alkali metal tripolyphosphate and about 30 to 5.5 parts by weight of alkali metal hydroxide, at least about 75% of said phosphate being capable of remaining non-reverted upon storage of said composition.

2. The composition of claim 1 wherein said alkali metal tripolyphosphate is sodium tripolyphosphate and said alkali metal hydroxide is sodium hydroxide and said composition has less than about 5% by weight moisture.

3. The composition of claim 1 wherein said composition includes at least one member selected from the group consisting of sodium chloride, sugar, alkali metal nitrite, alkali metal nitrate, and antioxidant compound having an enediol group.

4. The composition of claim 2 wherein said composition includes at least one member selected from the group consisting of sodium chloride, sugar, alkali metal nitrite, alkali metal nitrate, and antioxidant compound having an enediol group.

5. A particulate composition suitable for use in meat curing media, which composition comprises about 70 to 94.5 parts by weight of alkali metal tripolyphosphate and about 30 to 5.5 parts by weight of alkali metal hydroxide and less than about 5% by weight moisture, at least about 75% of said phosphate being capable of remaining non-reverted upon storage of said composition in a moisture-impervious barrier.

6. A particulate composition suitable for use in meat curing media, which composition comprises about 70 to 94.5 parts by weight of alkali metal tripolyphosphate and about 30 to 5.5 parts by weight of alkali metal hydroxide and less than about 5% by weight moisture, at least about 75% of said phosphate being capable of remaining non-reverted upon storage of said composition in a moisture-impervious barrier for at least about 2 months.

7. A substantially non-caking, free-flowing, non-dusting, quick-dissolving, compacted composition suitable for use in meat curing media and having good solubility characteristics in pickle liquor, which composition is in the form of substantially chemically uniform and non-fragile granules substantially free of water comprising about 70 to 94.5 parts by weight of alkali metal tripolyphosphate and about 30 to 5.5 parts by weight of alkali metal hydroxide, at least about 75% of said phosphate being capable of remaining non-reverted upon storage of said composition.

8. The composition of claim 7 wherein said alkali metal tripolyphosphate is sodium tripolyphosphate and said alkali metal hydroxide is sodium hydroxide and said composition has less than about 5% by weight moisture.

9. A package comprising a particulate composition substantially free of water within a substantially moisture-impervious barrier, said composition being suitable for use in meat curing media and having good solubility characteristics in pickle liquor and comprising about 70 to 94.5 parts by weight of alkali metal tripolyphosphate and about 30 to 5.5 parts by weight of alkali metal hydroxide, a major portion of said phosphate being capable of remaining non-reverted upon storage of said composition within said barrier for at least about 2 months.

10. The package of claim 9 wherein said alkali metal tripolyphosphate is sodium tripolyphosphate and said alkali metal hydroxide is sodium hydroxide and said composition has less than about 5% by weight moisture.

11. The package of claim 9 wherein said alkali metal tripolyphosphate is sodium tripolyphosphate and said alkali metal hydroxide is sodium hydroxide and said composition has not more than about 2% by weight moisture.

12. A package comprising a substantially non-caking, free-flowing, non-dusting, quick-dissolving, compacted composition within a substantially moisture-impervious barrier, said compacted composition being suitable for use in meat curing media and being in the form of substantially chemically uniform and non-fragile granules comprising about 70 to 94.5 parts by weight of alkali metal tripolyphosphate and about 30 to 5.5 parts by weight of alkali metal hydroxide and having less than about 5% by weight moisture, a major portion of said phosphate remaining non-reverted upon storage of said composition within said barrier.

13. The package of claim 12 wherein said alkali metal tripolyphosphate is sodium tripolyphosphate and said alkali metal hydroxide is sodium hydroxide.

14. The method of producing substantially free-flowing, non-caking, non-dusting, compacted, granular composition having alkali metal tripolyphosphate and alkali metal hydroxide and suitable for use in meat curing media, which method comprises subjecting a substantially uniform, substantially dry, particulate mixture having about 70 to 94.5 parts by weight of alkali metal tripolyphosphate and about 30 to 5.5 parts by weight of alkali metal hydroxide to compaction pressure in the substantial absence of water and under controlled compaction pressure and temperature conditions to cause effective, controlled compaction and bonding together of the ingredients of said mixture so that a major portion of said phosphate remains non-reverted, to produce said compacted granular composition wherein a major portion of said phosphate remains non-reverted upon storage of said composition.

15. The method of claim 14 wherein said alkali metal tripolyphosphate is sodium tripolyphosphate and said alkali metal hydroxide is sodium hydroxide.

16. The method of producing substantially free-flowing, non-caking, non-dusting, compacted, granular composition having alkali metal tripolyphosphate and alkali metal hydroxide and suitable for use in meat curing media, which method comprises forming a substantially uniform, substantially dry particulate mixture having about 70 to 94.5 parts by weight of alkali metal tripolyphosphate and about 30 to 5.5 parts by weight of alkali metal hydroxide and controlling the temperature of said mixture so that the temperature of said mixture does not exceed about 80° F. and substantial reversion of said phosphate is not initiated, and compacting said mixture in the substantial absence of water and under controlled compaction pressure and temperature conditions to cause effective compaction and bonding together of the ingredients of said mixture so that the temperature of said mixture does not exceed about 110° F. and a major portion of said phosphate remains non-reverted, to produce said compacted granular composition wherein a major portion of said phosphate remains non-inverted upon storage of said composition.

17. The method of claim 16 wherein said alkali metal tripolyphosphate is sodium tripolyphosphate and said alkali metal hydroxide is sodium hydroxide.

18. The method of producing a packaged, substantially free-flowing, non-caking, non-dusting, compacted, granular composition having alkali metal tripolyphosphate and alkali metal hydroxide and suitable for use in meat curing media, which method comprises subjecting a substantially uniform, substantially dry, particulate mixture having about 70 to 94.5 parts by weight of alkali metal tripolyphosphate and about 30 to 5.5 parts by weight of alkali metal hydroxide to compaction pressure in the substantial absence of water and under controlled compaction pressure and temperature conditions to cause effective, controlled compaction and bonding together of the ingredients of said mixture so that a major portion of said phosphate remains non-reverted to produce said compacted granular composition, and placing said compacted granular composition within a moisture-impervious barrier, a major portion of said phosphate remaining non-reverted upon storage of said composition within said barrier.

19. The method of claim 18 wherein said alkali metal tripolyphosphate is sodium tripolyphosphate and said alkali metal hydroxide is sodium hydroxide.

References Cited

UNITED STATES PATENTS

| | | | |
|---|---|---|---|
| 2,739,899 | 3/1956 | Hollenbeck | 99—159 |
| 3,104,978 | 9/1963 | Elder | 99—222 |
| 3,122,442 | 2/1964 | Sair | 99—222 |
| 3,139,347 | 6/1964 | Sair et al. | 99—159 |
| 3,193,396 | 7/1965 | Sair | 99—222 |
| 3,215,540 | 11/1965 | Wierbicki et al. | 99—222 |
| 3,231,392 | 1/1966 | Sair | 99—159 |
| 3,252,808 | 5/1966 | Sair et al. | 99—222 |
| 3,391,007 | 7/1968 | Sair et al. | 99—159 |

HYMAN LORD, Primary Examiner

U.S. Cl. X.R.

99—159

PO-1050
(5/69)

UNITED STATES PATENT OFFICE
CERTIFICATE OF CORRECTION

Patent No. 3,561,983      Dated February 9, 1971

Inventor(s) Louis Sair and Irving Melcer

It is certified that error appears in the above-identified patent and that said Letters Patent are hereby corrected as shown below:

Column 2, line 53, change "solublility" to --solubility--; column 3, line 23, change "Consumers" to --Consumer--; column line 12, change "ing" to --ing,--; column 5, line 50, change "noncaking" to --non-caking--; column 8, line 7, change "subst tialy" to --substantially--; column 8, line 60, change "and" t --and,--; column 9, line 43, change "nitrate" to --nitrite--; column 9, line 44, change "evidence" to --evidenced--; column line 12 (Table 4), change "nitrate" after "Residual" to --nitr column 11, line 59 (Table 5), change "nitrate" after "Residual to --nitrite--; column 12, line 53, change "same" to --hams--; column 13, line 70, change "were" after "hams" to --was--; column 15, line 39, change "of" after "first method" to --a--; column 16, all of Table 13 in lines 4-17 should appear immedi after the paragraph ending in line 75 of column 15; column 16, line 40, change "C." following "167°" of Table 14 to --F.--; column 24, title immediately below "Table 26", change "[Stabil determinations made from 1 lb. sample]" to --Stability Determi tions Made from 1 Lb. Sample--; column 24, under "Length of storage" in Table 26, the second entry should be changed from "10 d ys" to --10 days--; column 24, title immediately below "Table 27", change "[Effect of controlled humidity on the stability of blend]" to --Effect of Controlled Humidity on the Stability of Blend--; column 25, title immediately below "Tabl 28", change "Moisture content of composition "A-1"" to --Moisture Content of Composition "A-1"--; column 25, lines 46 after each of "12.5" and "13.0" in Table 28, insert --%--; column 25, title immediately below "Table 29", change "[Stabil of Composition A-1 (12.5% added water)" to --Stability of Composition "A-1" (12.5% added water)--; column 26, title imme ately below "Table 30", change "[Stability of Composition A-2 (no added water)]" to --Stability of Composition "A-2" (no add water)--; column 26, line 27, in the heading for the third column in Table 30, place --)-- after "(alcohol-soluble"; column 26, title immediately below "Table 31", change "[Stabil Page Two

PO-1050
(5/69)

UNITED STATES PATENT OFFICE
CERTIFICATE OF CORRECTION

Patent No. 3,561,983      Dated February 9, 1971

Inventor(s) Louis Sair and Irving Melcer

It is certified that error appears in the above-identified patent and that said Letters Patent are hereby corrected as shown below:

of Composition B-1 (12.5% added water)]" to --Stability of Composition "B-1" (12.5% added water)--; column 27, title immediately below "Table 32", change "[Stability of Compositi B-2 (no added water)]" to --Stability of Composition "B-2" (r added water)--; column 27, title immediately below "Table 33' change "Moisture content of composition "C-1"" to --Moisture Content of Composition "C-1"--; column 27, title immediately below "Table 34", change "[Stability of Composition C-1 (12.! added water)]" to --Stability of Composition "C-1" (12.5% ad( water)--; column 28, title immediately below "Table 35", char "[Stability of Composition C-2 (no added water)]" to --Stabi: of Composition "C-2" (no added water)--; column 28, title imn ately below "Table 36", change "[Stability of Compositions D- D-2, D-3 and D-4]" to --Stability of Compositions "D-1", "D-2 "D-3" and "D-4"--; column 28, in each of the four headings ur "Percent sodium tripolyphosphate which reverted" in Table 36, insert --)-- after "water".

Signed and sealed this 16th day of November 1971.

(SEAL)
Attest:

EDWARD M. FLETCHER, JR.      ROBERT GOTTSCHALK
Attesting Officer      Acting Commissioner of Patents